United States Patent [19]
Devries et al.

[11] Patent Number: 5,235,640
[45] Date of Patent: Aug. 10, 1993

[54] MASTER DECODER FOR TELEVISION SIGNAL SCRAMBLE SYSTEMS

[75] Inventors: Adrian J. Devries, Aurora, Ill.; Bruno A. Rist, Woodland Hills, Calif.

[73] Assignee: International Telesystems, Inc., Pacific Grove, Calif.

[21] Appl. No.: 455,512

[22] Filed: Dec. 21, 1989

[51] Int. Cl.⁵ .......................................... H04N 7/167
[52] U.S. Cl. ........................................ 380/13; 380/7; 380/10; 380/39; 380/40
[58] Field of Search .................. 380/6, 7, 9, 10, 13, 380/39, 40, 38

[56] References Cited

U.S. PATENT DOCUMENTS 3,896,262  7/1975  Hudspeth et al. ...................... 380/7
4,623,918  11/1986  Chomet ................................... 380/7

Primary Examiner—Bernarr E. Gregory
Attorney, Agent, or Firm—David O. O'Reilly

[57] ABSTRACT

A master decoder for scrambled television signals in which the signals are processed in a circuit by converting them to other frequencies and then removing the scrambling signal. One method uses one or more narrow filters at a fixed frequency with the television signal being heterodyned down to the frequency of the filters to place the scrambling signals in the rejection band of one of the filters. A second method eliminates scrambling signals by filters at video frequencies. In this method, the frequency in phase with the television signal carrier of a television channel is regenerated by filtering it with a narrow crystal filter and by means of an automatic phase comparison (APC) loop. The regenerated carrier is then used to synchronously demodulate the television signal. A third method for removing the scrambling signals is by use of one or more comb filters. A comb filter using a delay line produces periodic rejecting bands spaced at selected frequencies which are equal to the reciprocal of the delay produced by the delay lines. The delay lines are video delay lines with a delay of one horizontal line which are used to produce rejection bands spaced by the horizontal frequency.

29 Claims, 3 Drawing Sheets

MASTER DECODER FOR TELEVISION SIGNAL SCRAMBLE SYSTEMS

FIELD OF THE INVENTION

This invention relates to decoders for television scramble systems and more particularly, relates to a universal decoder for a system the injects a scramble signal near the video carrier.

BACKGROUND OF THE INVENTION

Many television system scramble systems have been proposed which inject an interfering carrier into the television signal being broadcast. To obtain a picture with good video quality, the user has to filter out the scrambling signal, emulating the response used by the broadcaster. One recent U.S. Pat. No. 4,825,467, issued Apr. 25, 1989, describes an encoded television signal in which one or more interfering characters is injected in specific frequency slots in close proximity to the video carrier. These interfering carriers can be injected either above or below the video carrier, preferably between harmonics of the horizontal frequencies. The interfering carriers are then removed at the receiver by very narrow band rejection filters, constructed of quartz crystal bulk resonators or surface acoustic wave filters. These devices are essentially filters on a chip. A separate filter is required for each interfering carrier injected into the television signal.

A new filter or decoder is required whenever the interfering carrier frequency is changed. This is particularly attractive at the television, because viewers can be required to purchase a removable plug-in type filter to view a selected program on a pay-per-view basis. However, it would be advantageous if there was a universal decoding system for use on mobile receivers that could be used for testing and analyzing the effectiveness of the system at various locations. The broadcaster also might find other effective uses of a universal decoder at the broadcasting end in to improve the system.

It is, therefore, one object of the present invention to provide a universal decoder that can receive and remove one or more interfering carriers injected into a television signal.

Yet another object of the present invention is to provide a system for universally decoding television transmission security systems by converting the spectrum such that the scrambling signal falls in a sharp notch filter. The conversion is done multiple times in cascade to allow for the removal of multiple scrambling signals.

Still another object of the present invention is to provide a decoder in which the television signal is converted such that a scrambling signal falls into a notch of a narrow band rejection filter at a pre-selected frequency after which the signal is again converted back up to its original frequency for viewing.

Yet another object of the present invention is to provide a universal decoder that provides signal detection and a comb filter to remove the scrambling signal or signals.

Yet another object of the present invention is to provide a universal decoder for removing interfering carriers in a television signal which is based on the use of a low-cost video-frequency delay line for removing interfering carriers.

Still another object of the present invention is to provide a universal decoder for removing interfering carriers from a television signal using double comb filters at video frequencies.

BRIEF DESCRIPTION OF THE INVENTION

The purpose of the present invention is to provide a universal decoder for use with television scrambling systems such as that disclosed and described in U.S. Pat. No. 4,825,467 issued Apr. 25, 1989.

The universal decoder of the present invention uses several methods for removing interfering carriers from a television signal. The universal decoder can decode or remove interfering carriers without being necessarily an exact duplicate of the narrow band notch filter described in the above identified patent. This "universal" decoder has to be agile enough that it can at least decode all the channels available in the local area and can accommodate scrambling signals in any of about forty frequency slots for each channel.

The above identified patent describes multiple scrambling carrier frequencies that can be used and the universal decoder should be able to decode the scrambled television signal with up to three interfering carriers. In keeping with the above requirements, several methods have been conceived.

The first method for removing the scrambling interfering character is to eliminate it by a standard filter at one particular IF frequency. To do this, the signal is frequency translated such that the scrambling frequency falls at the approximate center of a standard filter frequency. In order to accommodate the possibility that up to three scrambling carriers may be utilized for a single channel, this frequency can be translated three times in cascade. The decoder, therefore, will be designed to decode any television channel and can handle at least three scrambling signals in each channel. To filter out the scrambling signals, the transmitted television signal is heterodyned down by means of a local oscillator such that one scrambling signal falls into a notch of a narrow band rejection filter. The notch can be at an IF frequency of 45.75 MHz, for example. Spurious responses can be rejected by passing the signal through a regular IF filter, wide enough to pass the full channel. The signal is then upconverted again to its original frequency using the same local oscillator. To accommodate at least three scrambling carrier, this process is repeated two more times in cascade. Different local oscillator frequencies are required, and in principle, three frequency synthesizers are needed. The synthesizers can share several circuit elements.

A second method of descrambling or decoding the scrambled television signal is to convert the channel to be watched to a standard IF frequency, using a frequency synthesizer as a local oscillator. The synthesizer will be able to generate a separate local oscillator frequency for each possible channel. This frequency, which can be as high as 950 MHz, has to be accurate to about 1 KHz, and an ovenized crystal is needed. The synthesizer will deliver any of about 180 frequencies. The synthesizer is relatively simple, and is controlled by switches or by a microprocessor. A narrow crystal band pass filter with a 10 KHz band pass at the IF frequency (e.g., 45.75 MHz) filters the television signal carrier out while all the scrambling signals and most modulated video signals are suppressed. A pure carrier is now generated in a local oscillator which is controlled by an automatic phase comparison (APC) loop. The resultant extracted carrier is in quadrature phase relation with the carrier (at IF) and can be used (after a phase correction)

to synchronously detect the IF television signal. The synchronous detector is then fed into a filter bank of 20 narrow band rejection filters tuned to intermediate harmonic frequencies. Each filter can be switched in or out by switches under control of the operator or user. The required quality factor (Q) of the filters varies from about 1 for a scrambling signal close to the carrier to about 20 for a scrambling signal close to the twentieth harmonic. At least one adjustable inductor can be used per filter although other technologies (e.g., active filters) are feasible. The television signal is then remodulated using an integrated circuit and a local oscillator back to the original frequency for viewing without distortion.

Another system utilizes a comb filter to eliminate the scrambling carrier. The most economical approach for the decoder is based on a low-cost video-frequency delay line. The essential part of the decoder is a delay line, having a band pass formed by an attenuator and phasing adjuster. The delay line will consist, typically, of a substrate made of temperature compensated glass with input and output transducers bonded to two facets of the substrate. The substrate is shaped so that a narrow acoustic beam is transmitted by one transducer and reflected several times against substrate boundaries before it illuminates the second transducer. To utilize the comb filter selectively at a video frequency of a delay line, the desired channel is typically first translated to an appropriate IF frequency (e.g., 45.75 MHz). If the local oscillator is above the channel allocation, this causes a frequency inversion such that high video frequencies will fall below the video carrier. The signal is subsequently translated to the frequency range of the delay line with a local oscillator above the IF frequency such that the channel frequencies are inverted again and the video carrier falls at the left side of the spectrum. In the first stage of the system, the channel is selected by an RF bandpass filter and translated by modulation with a local oscillator to an intermediate frequency and filtered in a filter. The filter will be different from a standard intermediate frequency (IF) filter, because the vestigial sideband will not be materially attenuated. The attenuation will be considerable at frequencies of 4.4 MHz above the picture carrier. A second modulation stage translates the signal to the desired frequency position by means of a local oscillator with a frequency that is the sum of the frequency of the picture carrier and the center frequency of the delay line. The resulting signal is then applied to the comb filter and following this to an equalizer. In the pass band of the delay line, the peak amplitudes are 6 dB above the amplitude outside the pass band and this "amplitude step" is equalized in amplitude and phase. A subsequent upconverter translates the signal to a standard television channel frequency with the interfering carrier removed. In use the above concept is not very practical because the zeros are very narrow. Therefore, a variation of this concept will use two comb filters in cascade to overcome the effect of the narrowness of the zeros.

Delay lines with a center frequency of 3.58 MHz are readily available for the NTSC system. To overcome the narrowness mentioned above, an arrangement which uses two delay lines at 3.58 MHz. was found to make the zeros considerably wider. The theoretical 40 db bandwidth becomes about 1,000 Hz for a two-delay line comb filter versus 100 Hz for a single stage. For the first 20 harmonics around the carrier, the maximum attenuation is typically better than 40 dB. Decoding with this arrangement is reasonable and requires a set of delay lines with all the controls for multiple scrambling signals. The above and other novel features and advantages of the invention will be more fully understood from the following detailed description and the accompanying drawings, in which:

DETAILED DESCRIPTION OF THE INVENTION

Figure 1:
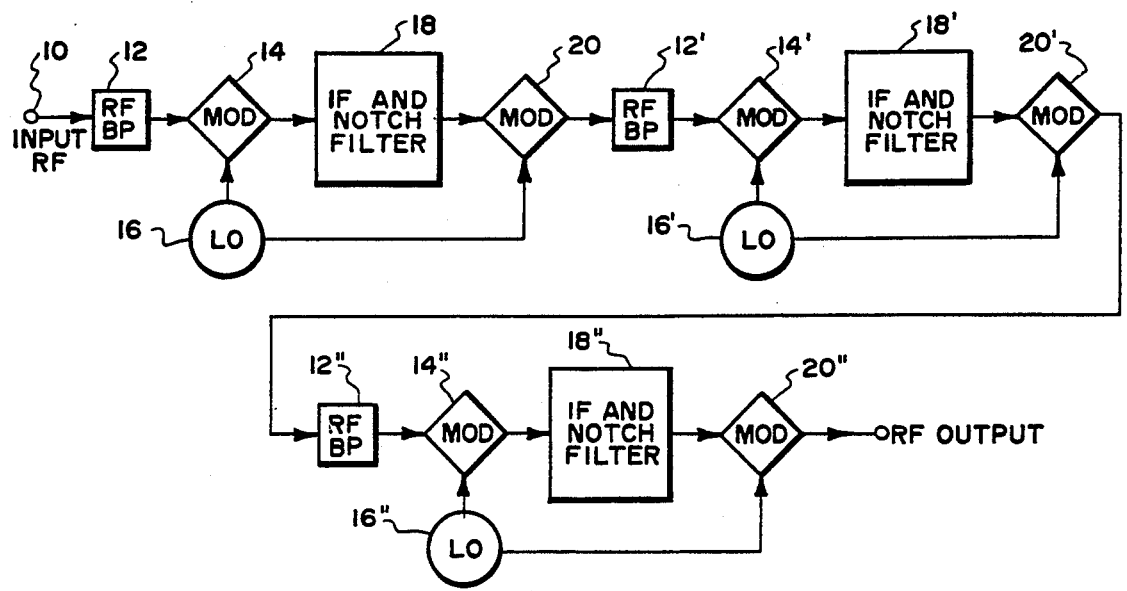
FIG. 1 is a block diagram of a decoding system in which the television signal is heterodyned to a preselected frequency range so that the scrambling signal falls at the center frequency of a narrow band elimination filter.

A universal decoder is shown in FIG. 1 having circuitry for eliminating up to three scrambling carriers or signals. The television signal is heterodyned down to a preselected frequency range so that one of the scrambling signals falls at the center frequency of a narrow band elimination filter. This process is then repeated two more times in cascade to remove two additional interfering carriers.

In the decoder of FIG. 1, the transmitted television signal is input at terminal 10 to an RF bandpass filter 12 and is then heterodyned down by means of modulator 14 receiving an input from local oscillator 16, such that one scrambling signal falls into the narrow notch of a narrow band rejection filter. To avoid spurious responses, the television signal also passes through a regular filter in filtering system 18, wide enough to pass the full channel. The television signal from the filtering system 18 is then upconverted to its original frequency by modulator 20, using the same local oscillator 16.

Local oscillator 16 has a precision and stability of about 100 Hz at a frequency which can be as high as 930 MHz. To be able to eliminate any scrambling signals in any channel, the local oscillator is very versatile and able to produce about 40 times 82 frequencies (e.g., 40 possible scrambling frequencies and 82 possible channels for a total of about 2900 frequencies. A crystal controlled frequency synthesizer is the best solution for this purpose.

Figure 2A:
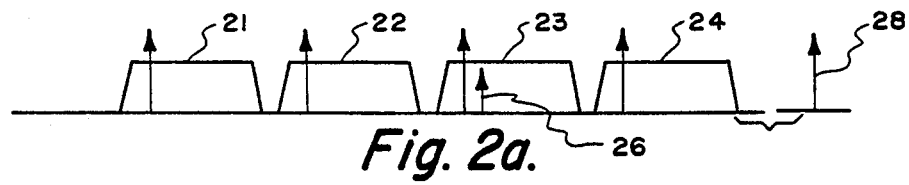
FIG. 2a is a frequency diagram of a few television channels and a local oscillator frequency to convert one of those channels to an intermediate frequency (IF).

A frequency diagram of a few television channels and a local oscillator frequency to convert one of those channels to IF is illustrated in FIG. 2a. Each portion 21-24 illustrates a particular adjacent T.V. channel with channel labeled 23 having an interfering carrier 26. The frequency of local oscillator 16 is indicated at 28. The system of FIG. 1 is shown designed to eliminate three scrambling signals by repeating the process two more times, indicated by the same reference numbers, 12, 14, 16, 18 and 20 with single or double primes (e.g., 12, 12', 12"). Local oscillator 16' and 16" require different local oscillator frequencies and three frequency synthesizers are needed.

Figure 2B:
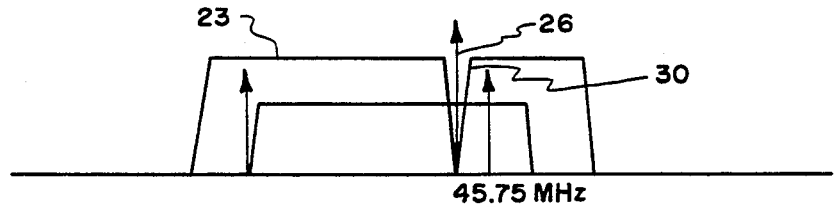
FIG. 2b illustrates the particular channel after conversions, illustrating the scrambling signal falling at the rejection frequency of a narrow band elimination filter.

The television signal 23 is shown heterodyned down to another frequency range in FIG. 2b, such that scrambling signal 26 falls at the center frequency (in this case, e.g., 45.75 MHz) of sharp notch band elimination filter indicated at 30. If there are more than a single band elimination filter, the process will be repeated an additional number of times equal to the number of additional interfering carriers.

Figure 3:
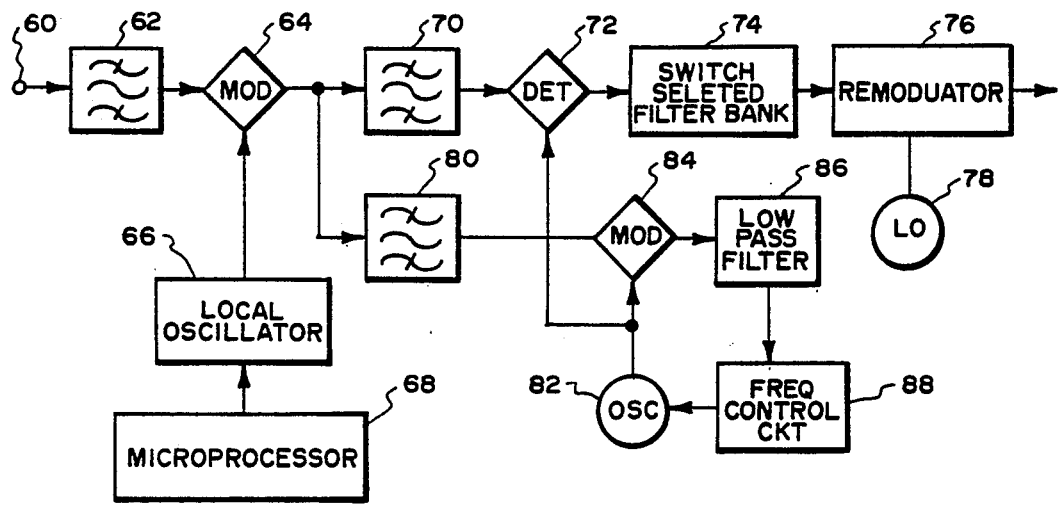
FIG. 3 is a block diagram of a decoder in which the television channel to be viewed is precisely converted to an IF frequency range.

Another approach for decoding for decoding the television signal is illustrated in FIG. 3. In this approach, the T.V. channel to be watched is received at Terminal 60, passed through an RF filter 62, and then is converted down in modulator 64 to a standard IF frequency, using a frequency synthesizer 66 as a local oscillator. The frequency, in the range between 100 MHz. and 930 MHz. should be accurate to about 1 kHz. For a channel in the Broadcast Band, synthesizer 66 has the capability to deliver any one of 82 frequencies. Synthesizer 66 is relatively simple and is controlled by switches or by a simple microprocessor 68. A narrow crystal band pass filter 80 with a 10 kHz pass band at the IF frequency (e.g., 45.75 MHz.) filters out the carrier while all the scrambling signals and most of the modulated video signals are suppressed. A pure carrier is now generated in a local oscillator 82 which is controlled by an automatic phase comparison (APC) loop comprised of modulator 84, low pass filter 86 and frequency control circuit 88 which controls oscillator 82. The resultant carrier is in quadrature phase relationship with the carrier passing through IF filter 80 and can be used after a phase correction to synchronously detect the IF signal in synchronous detector modulator 72. The output of synchronous detector 72 is fed to filter bank 74 of 20 narrow band rejection filters tuned to H/2, 3H/2, etc. Each filter in filter bank 74 can be switched in or out by switches under control of the user or customer. The required quality factor (Q) of the filters varies from about 1 for the H/2 filter to about 20 for the 41 H/2 filter. At least one adjustable inductor is used per filter. Alternatively, other band elimination filters, as active filters, can be used. The signal is then remodulated in integrated circuit remodulating chip 76 with local oscillator 78.

Figure 4:
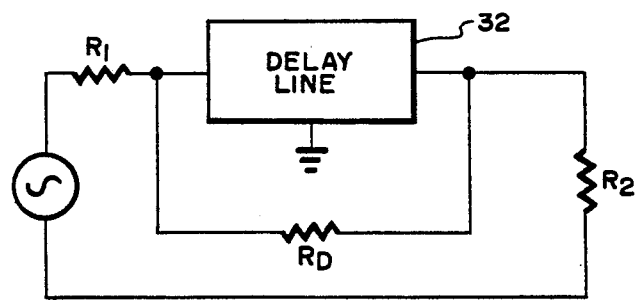
FIG. 4 is a schematic block diagram of a decoder concept in which a delay line is converted to a comb filter.
Figure 7A:
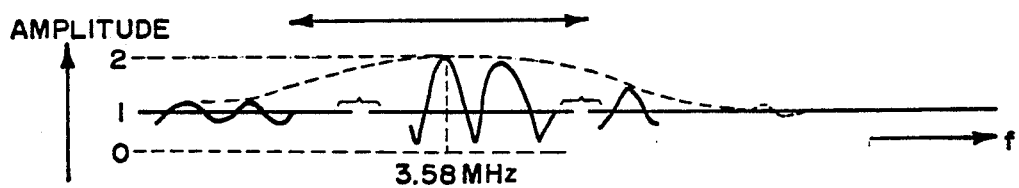
FIGS. 7a and 7b illustrates the frequency response of a comb filter using a video delay line with a maximum response at a predetermined frequency.
Figure 7B:
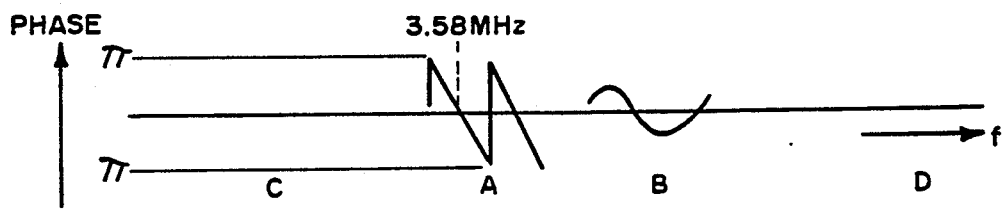

Another approach to filtering or decoding a scrambled T.V. signal is by using a comb filter approach, utilizing a delay line. A delay line is illustrated in FIG. 4, having a delay of D microsecond with a resister R in parallel with delay line 32. If the value of resister R is chosen such the magnitude of the signal through the delay line is the same as the magnitude of the signal through the resister, the complete network will have the response of a comb filter. The response of the comb filter can be approximated by:

$$H(\omega)=A(1+e^{-j\omega D}) \qquad (1)$$

Where A is a constant (where the frequency response is flat) and D is the delay of delay line 32 and $\omega$ is the circle frequency. FIGS. 7a and 7b show the frequency response of a comb filter using a video delay line with a maximum response at 3.58 MHz. The video delay line is an acoustic device where an ultrasonic beam travels in the interior of a glass plate at the velocity of sound. In that way, relatively long delays (e.g. 60 $\mu$sec.) can be obtained in a small device. The transducers of the delay line have a band pass response, which in a standard television (NTSC) system delay line is designed to peak at 3.58 MHz. A typical 3 dB bandwidth is 1.5 MHz. If the resistor R is selected to equal the response at 3.58 MHz, the overall amplitude response of the comb filter is as shown in FIG. 7a while FIG. 7b shows the phase response. In the center region of FIG. 7 the rejection band has deep zeros and the phase oscillates between $+\pi$ and $-\pi$. In the center of the response, the output signal of the delay line is equal to the signal through the resistor and effectively doubles the output signal. Outside the pass band (indicated at regions B and C) both phase and amplitude fluctuations are reduced while at region D, the signal on the delay line has become very small and the signal is nearly completely determined by resistor R. Expression (1) above describes the filter response at region A.

A delay line with a delay D of 63.557 $\mu$sec (microseconds) (1/H) can be used such that the carrier of the modulated scrambled T.V. signal falls at 3.58 MHz, the center frequency of the delay line. Further, the maxima of the filter fall at harmonics of the horizontal frequency H and the minima at the frequencies of the scrambling signals which in the television scramble security system are typically at half harmonics of the horizontal frequency H.

The 40 dB bandwidth of the filter shown in FIG. 4 can be calculated readily and is only 100 Hz which requires very good frequency stability of the local oscillators to convert a scrambled television signal to the delay line frequency band. If two of the comb filters shown in FIG. 4 are cascaded, one can easily calculate that the 40 dB band width becomes about 1000 Hz. The "effective" frequency response will now be 12 dB higher at the carrier than outside the pass band of the delay line and the phase will oscillate between $+2\pi$ to $-2\pi$ but the "effective" phase response will still be approximately linear. A system using a cascade of two comb filters is shown in the schematic block diagram of FIG. 5. The channel with the scrambled program has to be translated to the frequency range of the delay line. It is not very practical to do this in a single conversion, and therefore, the first frequency conversion will be at intermediate (IF) frequency, which can be equal to the standard IF frequency of 45.75 MHz. The television channel signal is applied to terminal 40 and then to RF band pass filter 44 which provides image rejection for modulator 46 and the IF filter 48 attenuates adjacent channels. The filter will be different from a standard IF filter because the full vestigial sidebands will be passed. A second modulator 50 translates the signal to the frequency range of the comb filter such that the video carrier will fall exactly at the center frequency of the comb filter. Modualators 46 and 50 receive inputs from local oscillators 47 and 49, which have a required accuracy and stability of the order of a few hundred Hz, using stable quartz controlled frequency sources. If this decoder has to decode several channels, a quartz stabilized frequency synthesizer will be used for Local Oscillator 47. After the frequency translations, the signal is passed through low pass filter 67 and then applied to two comb filters comprised of delay lines 52 and 52', adjustable bypass resistors 54 and 54' and phase adjusting components 56, 56' and summing circuits 58 and 58'. If delay lines 52, 52' are sufficiently accurate, phase adjust components 56, 56' will not be needed. The comb filters 51, 51' are followed by a compensation network 60 which provides 12 dB additional gain at higher equivalent video frequencies to equalize the overall frequency response. The output of compensation network 60 is then translated to a standard channel by modulator 62 and local oscillator 64 for output to terminal 66.

Figure 5:
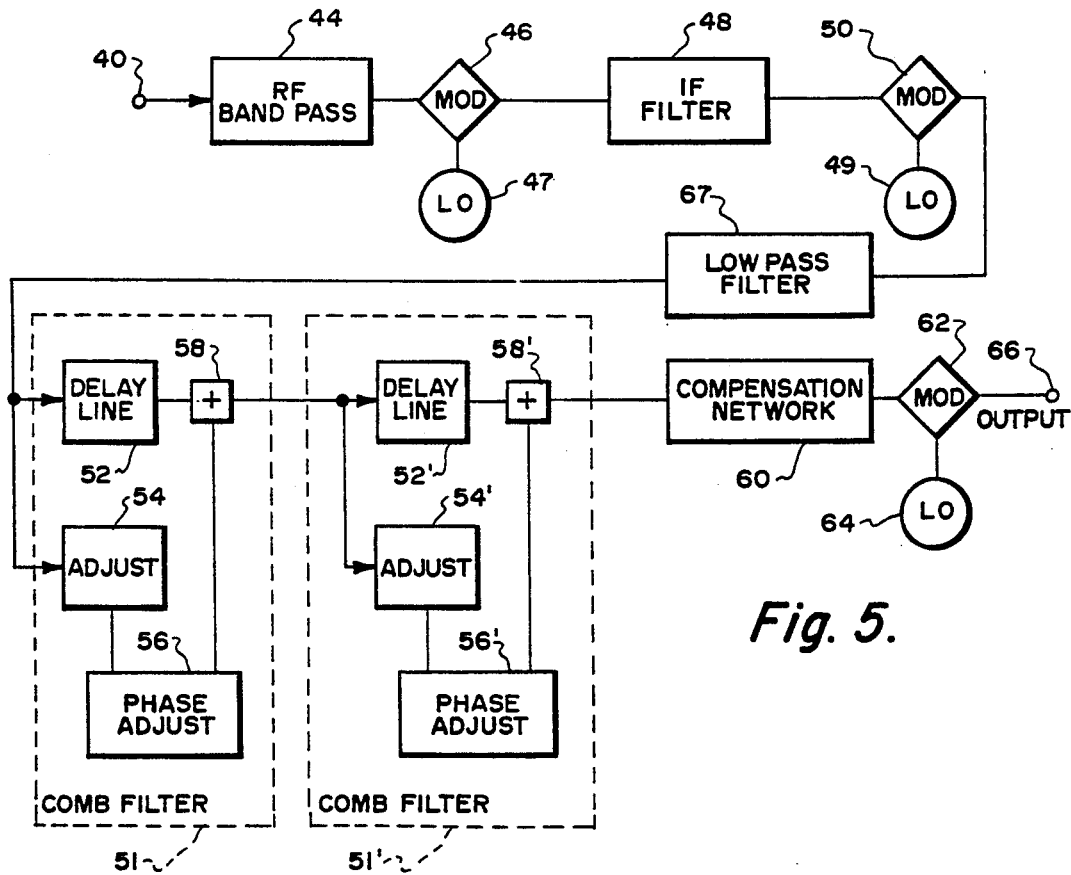
FIG. 5 is a block diagram of a decoder that uses two delay lines in cascade.
Figure 6A:
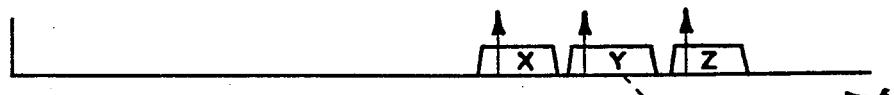
FIGS. 6a through 6c are graphs illustrating frequency translations in the decoder of FIG. 5.
Figure 6B:
Figure 6C:

The operation of the decoder of FIG. 5 is shown in the diagrams of FIGS. 6a through 6c, where the channel with the scrambled program is indicated at Y. The signal is modulated with the output from local oscillator 47 shown in FIG. 6B to produce the IF signal shown.

The comb filter decoder shown in FIG. 5 has rejection bands with the periodicity of H, the horizontal frequency. If the scrambling signal should be shifted away from the middle of the horizontal frequency, the comb filter may be tuned by the user or viewer by means of the phase adjustments 56 and 56'.

Thus, there have been disclosed several methods of providing a universal decoder for use in a variety of applications by Cable T.V. companies. One decoding system converts the spectrum so that the scrambling signal falls in a sharp notch filter. The conversion is done in cascade, the number of times equal to the number of scrambling signals in the received television picture. Another decoder detects the signal and uses filters at video frequencies to remove the scrambling signals from the T.V. picture. Another option uses a comb filter incorporating delay lines. A variation of this option includes two delay lines in cascade forming two comb filters.

This invention is not to be limited by the embodiment shown in the drawings and described in the description which is given by way of example and not of limitation, but only in accordance with the scope of the appended claims.

What is claimed is:

1. A decoder for elimination of at least one interfering carrier from a scrambled television signal transmission comprising;
   downconverting means downconverting said television signal transmission to a preselected intermediate frequency;
   pure carrier generating means for extracting a pure television signal carrier;
   synchronous detecting means receiving said television signal transmission at said intermediate frequency and said pure television signal carrier for synchronously detecting said television signal;
   a plurality of switchable filters receiving the output of said synchronous detecting means, said filters being switched in or out to remove said at least one interfering carrier;
   upconverting means receiving the output of said plurality of switchable filter means for converting said signal back to the frequency of the original television signal transmission;
   whereby said television signal can be viewed without disruption.

2. The decoder according to claim 1 in which said downconverting means comprises; modulating means; and frequency synthesizing means.

3. The decoder according to claim 2 including microprocessing means controlling the frequency output of said frequency synthesizing means.

4. The decoder according to claim 3 in which said extracting means comprises; a narrow crystal bandpass filter receiving said intermediate frequency signal; an automatic phase comparison loop receiving the output or said narrow crystal bandpass filter and generating a pure carrier.

5. The decoder according to claim 4 in which said narrow crystal bandpass filter has a bandpass of approximately 10 KHz at the preselected intermediate frequency.

6. A universal decoder for eliminating at least one interfering carrier from a television transmission signal transmission comprising;
   downconverting means converting said television signal transmission to a preselected intermediate frequency;
   quadrature phase generating means for generating a pure quadrature phase television signal carrier from said intermediate frequency signal;
   synchronous detecting means receiving said pure quadrature phase television signal carrier for synchronously detecting said television transmission signal;
   a narrow band rejection filter bank receiving the output of said synchronous detecting means, said narrow band rejection filter bank removing said at least one interfering carrier; and
   upconverting means for converting the output signal from said narrow band rejection filter bank back to the frequency of said original television signal transmission frequency
   whereby said television signal transmission may be viewed without distortion.

7. The decoder according to claim 6 in which said quadrature phase signal generating means comprises; a bandpass filter for filtering the intermediate frequency carrier out while suppressing the interfering carrier and modulated video signals; a local oscillator receiving the output of said bandpass filter; and an automatic phase comparison loop controlling the output of said local oscillator whereby a pure quadrature phase carrier is produced.

8. The decoder according to claim 7 in which said narrow band rejection filter bank comprises a plurality switchable narrow band rejection filters which can be selectively switched in or out of said decoder circuit.

9. A universal decoder for eliminating at least one interfering carrier from a television transmission signal comprising;
   at least one converting means converting said television signal to at least one preselected frequency;
   comb filter means having at least one center frequency at said at least one preselected frequency receiving the output of said converting means, said comb filter means having at least one rejection band at the frequency of said at least one interfering carrier so that said interfering carrier is removed by said comb filter means;
   equalization means receiving the output of said comb filter means for eliminating unwanted modulation products; and
   standard frequency converting means for converting the output of said equalization means back to the original standard television channel frequency;
   whereby said television signal can be viewed without substantial distortion.

10. The decoder according to claim 9 in which said converting means includes first converting means for converting said television signal to an intermediate frequency and second converting means for converting said intermediate frequency signal to a preselected frequency range of said comb filter.

11. The decoder according to claim 10 in which said comb filter comprises a video delay live; and a resistor in parallel with said delay line, said resistor selected so that the magnitude of the signal through the delay line and said resistor is equal.

12. The decoder according to claim 11 in which said comb filter means comprises a pair of comb filters in cascade.

13. The decoder according to claim 10 in which said first frequency converting means converts said television signal to a standard intermediate frequency of approximately 45.75 MHz.

14. The decoder according to claim 13 in which said comb filter means includes phase adjusting means for tuning said comb filter means.

15. A method of decoding a television signal transmission having at least one interfering carrier comprising;
converting said television signal to at least one lower frequency with said at least one interfering carrier at a preselected frequency;
passing said converted television signal through at least one band elimination filter means each having a rejection band approximately at said preselected frequency of said at least one interfering carrier;
upconverting the output of said at least one band elimination filter means back to the original frequency of said television signal transmission;
whereby said television signal may be viewed with minimum disruption.

16. The method according to claim 15 in which said converting means comprises modulating said television signal transmission with a local oscillator having a stability of approximately 100 Hz.

17. The method according to claim 16 in which said local oscillator is tunable up to approximately 2920 frequencies in the television signal transmission bands.

18. A method of decoding a television signal transmission having one or more interfering carriers comprising;
downconverting said television signal transmission to a preselected intermediate frequency;
generating a pure television signal carrier from said intermediate frequency signal;
synchronously detecting the television signal by modulating the intermediate frequency signal with said pure television signal carrier;
passing said synchronously detected signal through a narrow band filter bank to remove said one or more interfering carriers;
upconverting the output of said narrow band filter bank back to the frequency of the original standard television channel;
whereby said television signal can be viewed without distortion.

19. The decoding method according to claim 18 in which said television signal transmission is downconverted by modulating said television signal transmission with a signal from frequency synthesizing means.

20. The decoding method according to claim 19 including controlling said frequency synthesizing means with microprocessing means.

21. The decoding method according to claim 20 in which the step of extracting a pure carrier comprises passing said intermediate frequency signal through a narrow crystal bandpass filter; processing the output of said narrow crystal bandpass filter with an automatic phase comparison loop to generate a pure quadrative phase carrier.

22. The decoding method according to claim 21, in which narrow crystal bandpass filter has a bandpass of approximately 10 KHz at the preselected intermediate frequency.

23. A method of decoding a television signal transmission to remove at least one interfering carrier comprising;
converting said television signal transmission to the preselected intermediate frequency signal;
generating a pure quadrature phase television signal carrier from said intermediate frequency signal;
modulating said intermediate frequency signal having at least one interfering carrier with said quadrature phase pure television signal carrier to detect said television transmission signal;
passing said detected television transmission signal through a narrow band rejection filter bank to remove said at least one interfering carrier; and converting the output signal from said narrow band rejection filter bank to the original television signal transmission frequency;
whereby said television signal transmission may be viewed without distortion.

24. The decoding method according to claim 23 said step of generating said quadrature phase signal comprises passing said intermediate frequency signal through a bandpass filter for filtering the intermediate frequency carrier out and suppressing the interfering carrier and modulated video signal; processing the output of said bandpass filter with a local oscillator; controlling the output of said local oscillator with a phase comparison loop; whereby a pure quadrature phase carrier is produced.

25. The decoding method according to claim 24 including switching filters in said narrow band rejection filter bank in and out of said circuit to selectively reject the interfering carrier.

26. A method of decoding a television signal transmission having at least one interfering carrier comprising;
converting said television signal to at least one preselected frequency;
passing said signal at said preselected frequency through a comb filter means having at least one center frequency at said at least one preselected frequency whereby said at least one interfering carrier is rejected;
equalizing and filtering the output of said comb filter for eliminating unwanted modulation products; and
converting the output of said equalization and filtering circuit to convert the signal back to the original standard television channel frequency;
whereby said television signal can be viewed without substantial distortion.

27. The decoding method according to claim 26 in which converting said television signal to at least one preselected frequency comprises; converting said television signal to an intermediate frequency; and converting said intermediate frequency signal to a signal in the preselected frequency range of said comb filter.

28. The decoding method according to claim 27 in which said signal converted to said preselected frequency is passed through a pair of comb filters in cascade.

29. The decoding method according to claim 28 in which said comb filters include phase adjusting means for tuning said comb filter means.

* * * * *